(12) United States Patent
Brockman

(10) Patent No.: US 7,121,075 B2
(45) Date of Patent: Oct. 17, 2006

(54) CRANBERRY-HARVESTING APPARATUS AND METHOD

(76) Inventor: Danial William Brockman, 4409 Brockman Rd., Vesper, WI (US) 54489

( * ) Notice: Subject to any disclaimer, the term of this patent is extended or adjusted under 35 U.S.C. 154(b) by 0 days.

(21) Appl. No.: 10/760,445

(22) Filed: Jan. 20, 2004

(65) Prior Publication Data

US 2005/0155335 A1    Jul. 21, 2005

(51) Int. Cl.
*A01D 46/26* (2006.01)
(52) U.S. Cl. .............................. 56/330; 56/8
(58) Field of Classification Search ............. 56/328.1, 56/330, 331, 340.1, 8, 9
See application file for complete search history.

(56) References Cited

U.S. PATENT DOCUMENTS

| | | | | |
|---|---|---|---|---|
| 881,039 | A * | 3/1908 | Young | 56/229 |
| 1,483,725 | A * | 2/1924 | Harrison | 56/330 |
| 1,533,644 | A | 4/1925 | Gebhardt | |
| 1,629,831 | A | 5/1927 | Maglathlin | |
| 2,524,631 | A | 10/1950 | Minutillo | |
| 2,544,443 | A * | 3/1951 | Brateng | 56/330 |
| 2,696,706 | A * | 12/1954 | Getsinger | 56/330 |
| 2,732,677 | A * | 1/1956 | Nielsen | 56/330 |
| 3,439,482 | A * | 4/1969 | Orton | 56/330 |
| 3,672,140 | A * | 6/1972 | Furford | 56/330 |
| 3,822,537 | A * | 7/1974 | Sell | 56/330 |
| 4,501,111 | A * | 2/1985 | Abbott | 56/8 |
| 5,076,047 | A | 12/1991 | Rosset | |
| 5,375,402 | A | 12/1994 | Gidge | |
| 5,881,544 | A | 3/1999 | Furford | |
| 6,012,276 | A * | 1/2000 | Walker et al. | 56/330 |
| 6,779,329 | B1 * | 8/2004 | Yoder et al. | 56/330 |

* cited by examiner

*Primary Examiner*—Meredith Petravick
(74) *Attorney, Agent, or Firm*—Jansson, Shupe, Munger & Antaramian, Ltd.

(57) ABSTRACT

An apparatus and method for harvesting cranberries, the method including moving frame-mounted transverse dislodging rods over cranberry plants with each rod moving at the speed of the frame, thereby to dislodge cranberries from the cranberry plants. The apparatus includes a plurality of dislodging rods secured below the frame, the dislodging rods positioned substantially parallel to the field surface and generally perpendicular to the direction of movement whereby each dislodging rod is moved through the cranberry plants at the speed of the frame to dislodge the cranberries from the plants. Certain preferred embodiments use follower assemblies to configure an array of dislodging rods in an advantageous arrangement.

36 Claims, 7 Drawing Sheets

CRANBERRY-HARVESTING APPARATUS AND METHOD

FIELD OF THE INVENTION

This invention is related to cranberry harvesting and, more particularly, to cranberry-harvesting equipment and methods.

BACKGROUND OF THE INVENTION

Cranberries are raised in fields or bogs, which are relatively flat areas divided into sections so that the fields can be flooded both to facilitate harvesting and to protect the vines from frost. The cranberry plants form a mat of vines which may be up to twelve or fourteen inches deep. During harvesting, the berries are removed from the vines and float to the surface of the water. The berries are then gathered up for transport to a processing facility.

Traditional methods of harvesting cranberries and the equipment used to implement such methods generally fall into two categories. Both traditional methods have drawbacks which will be described herein later.

The first general method can be characterized as "beating" and is carried out using equipment which includes beaters which are bars mounted on combine-like revolving structures. U.S. Pat. No. 3,672,140 (Burford) discloses equipment based on this principal. As the harvesting vehicle moves through the cranberry bog, a rotating wheel with transverse bars to agitate the cranberry vines, causes the cranberries to detach from the plants. The rotation of the wheel causes the transverse bars to move through the cranberry vines at a speed greater than the vehicle speed at the position of principal contact with the plants. Cranberries float to the surface of the flooded bog and are gathered up. U.S. Pat. No. 4,501,111 issued to Abbott describes another harvester unit which uses such a rotating wheel approach.

The second general method can be characterized as picking or raking. U.S. Pat. No. 2,524,631 (Minutillo) describes a harvesting machine based on this method. A series of combs mounted on a rotating wheel is moved through the cranberry plants to detach the cranberries from the vines. U.S. Pat. No. 5,067,047 (Rosset) discloses harvesting equipment which employs vertically-oscillating tines to strip the cranberries from the vines. Rosset then collects the stripped cranberries through a vacuum suction unit.

As mentioned above, the methods and equipment which are used for cranberry harvesting have certain drawbacks. As in any commercial endeavor, increased productivity is in general a desired performance. Typical harvesting rates for the cranberry-harvesting equipment commonly used today is on the order of 0.5 acres per hour, with maximum rates being about 1.5 acres per hour. Productivity is also affected by the fraction of the fruit which is removed from the vines during harvesting. A higher fraction yields higher productivity.

Some of this equipment is quite "aggressive" in how it treats the cranberry plants, often resulting in damage both to harvested fruit as well as the vines. In addition, much of the equipment used today includes a number of moving parts, often driven by hydraulic equipment. The operation of hydraulic equipment during harvesting creates the risk of the fruit becoming contaminated with hydraulic fluid. Also, the complexity of the equipment translates into increased maintenance cost.

Finally, for cranberries which are sold as fresh fruit rather than processed into juice or other consumer food products, not only is it advantageous to prevent damage to the fruit, it is also of great benefit to avoid wetting the fruit during harvesting. As mentioned above, the fields or bogs are flooded, allowing the fruit which has been separated from the plants to float, thereby facilitating the collection of the fruit. However, the fruit, being now wet, is subject to the growth of fungus or requires the additional costly step of drying in order to deliver fresh, unblemished fruit to the market. Because of this, it is advantageous to dry-harvest cranberries to avoid these problems or costs.

Therefore, there is a need for simple, rapid and efficient, low-cost method and apparatus to harvest cranberries.

OBJECTS OF THE INVENTION

It is an object of this invention, in the field of cranberry-harvesting, to provide a cranberry-harvesting apparatus and method which harvest cranberries at substantially higher rates (acres per hour) than existing harvesting equipment and methods.

Another object is to provide cranberry-harvesting apparatus which is mechanically simple and requires a minimum of maintenance.

Another object is to a provide cranberry-harvesting apparatus and method which remove a higher fraction of the cranberries from the vines than existing harvesting equipment and method.

Another object is to provide cranberry-harvesting apparatus which can be both pushed or pulled through the field of cranberry vines.

Another object is to provide cranberry-harvesting apparatus which reduces the risk of contamination of the fruit being harvested.

Still another object is to provide cranberry-harvesting apparatus which reduces the damage to the cranberries being harvested.

Yet another object is to provide a cranberry-harvesting apparatus and method which can be used for both wet and dry harvesting of cranberries.

These and other objects of the invention will be apparent from the following descriptions and from the drawings.

SUMMARY OF THE INVENTION

The invention is a method and apparatus for harvesting cranberries, whereby frame-mounted transverse dislodging rods are moved over cranberry plants with each rod moving at the speed of the frame, thereby dislodging cranberries from the cranberry plants. The cranberry-harvesting apparatus of this invention comprises a frame movable over a field of cranberries in a forward direction with a plurality of follower assemblies each secured to and below the frame by a support. Each follower assembly includes: a rod mount having a lower portion, a surface-following leading end, and a pivot attachment to the support at the lower portion behind the center-of-gravity of the follower assembly; and first and second pairs of dislodging rods mounted to the rod mount forward and rearward of the pivot attachment respectively, each pair extending laterally from opposite sides of the lower portion substantially parallel to the field surface and canted rearwardly. Each rod mount is supported such that it moves through the cranberry plants at the speed of the frame to dislodge the cranberries from the plants.

In certain highly preferred embodiments of the inventive cranberry-harvesting apparatus, the first and second pairs of dislodging rods are spring-mounted such that the dislodging rods deflect under load in a plane substantially parallel to the field surface.

In another preferred embodiment of the cranberry-harvesting apparatus, each rod mount is a vertical plate having spring posts extending downward to the lower portion, and each dislodging rod has a coiled proximal end forming a spring coiled around one of the spring posts. Certain preferred embodiments of such apparatus further include feet extending from the lower portion rearwardly below each pair of spring posts for the purpose of reducing the entanglement of plants with the spring posts. In another preferred embodiment of the apparatus, the dislodging rods have a substantially circular cross-section.

In highly preferred embodiments of the cranberry-harvesting apparatus, the frame has a major axis generally perpendicular to the movement thereof and parallel to the field surface. Each dislodging rod has a free distal end, and the follower assemblies are laterally spaced substantially equally along the major axis in alternating forward and rearward positions thereby forming offset forward and rearward gangs of adjacent assemblies such that the distal ends of the dislodging rods of adjacent assemblies overlap along the major axis. The distal ends of the dislodging rods of adjacent assemblies of each gang are spaced apart along the direction of movement. In certain other embodiments of the inventive cranberry-harvesting apparatus, the space along the direction of movement between the dislodging rod distal ends of adjacent follower assemblies is at least four inches.

In highly-preferred embodiments of the cranberry-harvesting apparatus, the frame includes a principal cross-member, and each support includes a longitudinal arm pivotably mounted to the cross-member.

In some embodiments of the cranberry-harvesting apparatus, each longitudinal arm is downwardly spring-biased against the field surface. In such embodiments, it is most preferred that such apparatus include: an anchor arm affixed to the cross-member and having a first connection spaced therefrom; a second connection on the longitudinal arm spaced from the cross-member; and a spring linkage between the first and second connections such that the longitudinal arm moves under load with respect to the anchor arm to provide the downward biasing. In some embodiments, each surface-following leading end is substantially convex.

In other embodiments of the cranberry-harvesting apparatus, the frame is operator-movable up and down such that the surface-following leading ends can be positioned in and out of contact with the field surface.

In another preferred embodiment of the inventive apparatus, the space between the first and second pairs of dislodging rods is at least twelve inches. In addition, in some preferred embodiments, the cant angle of the dislodging rods is between 15 and 40 degrees from the major axis.

Some highly-preferred embodiments of the invention further include a drive apparatus to move the frame over a field of cranberries. In some embodiments, the frame is mounted to the front of the drive apparatus, and in other embodiments, the frame is mounted to the back of the drive apparatus.

Certain embodiments of the cranberry-harvesting apparatus include at least one vacuum nozzle behind the follower assemblies whereby the dislodged cranberries are picked up by vacuum suction. Some embodiments include a vacuum nozzle behind each of the follower assemblies. A collection container may also be included in such apparatus.

Broadly considered, the inventive cranberry-harvesting apparatus includes a frame movable over a field of cranberries in a forward direction and a plurality of dislodging rods secured to and below the frame. The dislodging rods are positioned substantially parallel to the field surface and substantially transverse to the direction of movement such that each dislodging rod is moved through the cranberry plants at the speed of the frame to dislodge the cranberries from the plants.

The inventive method for harvesting cranberries from a cranberry field includes moving frame-mounted transverse dislodging rods over cranberry plants with each rod moving at the speed of the frame to dislodge cranberries from the cranberry plants. One form of the inventive method of harvesting cranberries includes moving frame-mounted transverse dislodging rods over cranberry plants in a non-flooded field, thus moving each rod at the speed of the frame to dislodge cranberries from the cranberry plants, resulting in dry-harvesting of the cranberry fruit. Certain preferred embodiments of the inventive method further include the steps of vacuuming up dislodged cranberries immediately after dislodgement and collecting the cranberries in a collection container.

As used herein, the following terms have the meanings given below, unless the context requires otherwise.

The term "field surface" refers to the surface of the cranberry field from which cranberries are being harvesting. Most typically, this will be the upper surface of a mat of cranberry vines (rather than the surface of the soil) which are being compressed by the follower assemblies as such assemblies are biased downwardly and moved over the cranberry field.

The term "surface-following" is used herein to describe one function of the leading end of a follower assembly, indicating that the leading end enables the follower assembly to move over the field surface in a path which conforms to the contour of the field surface without digging into the field surface or becoming entangled with vegetation.

DETAILED DESCRIPTION OF PREFERRED EMBODIMENTS

Figure 1:
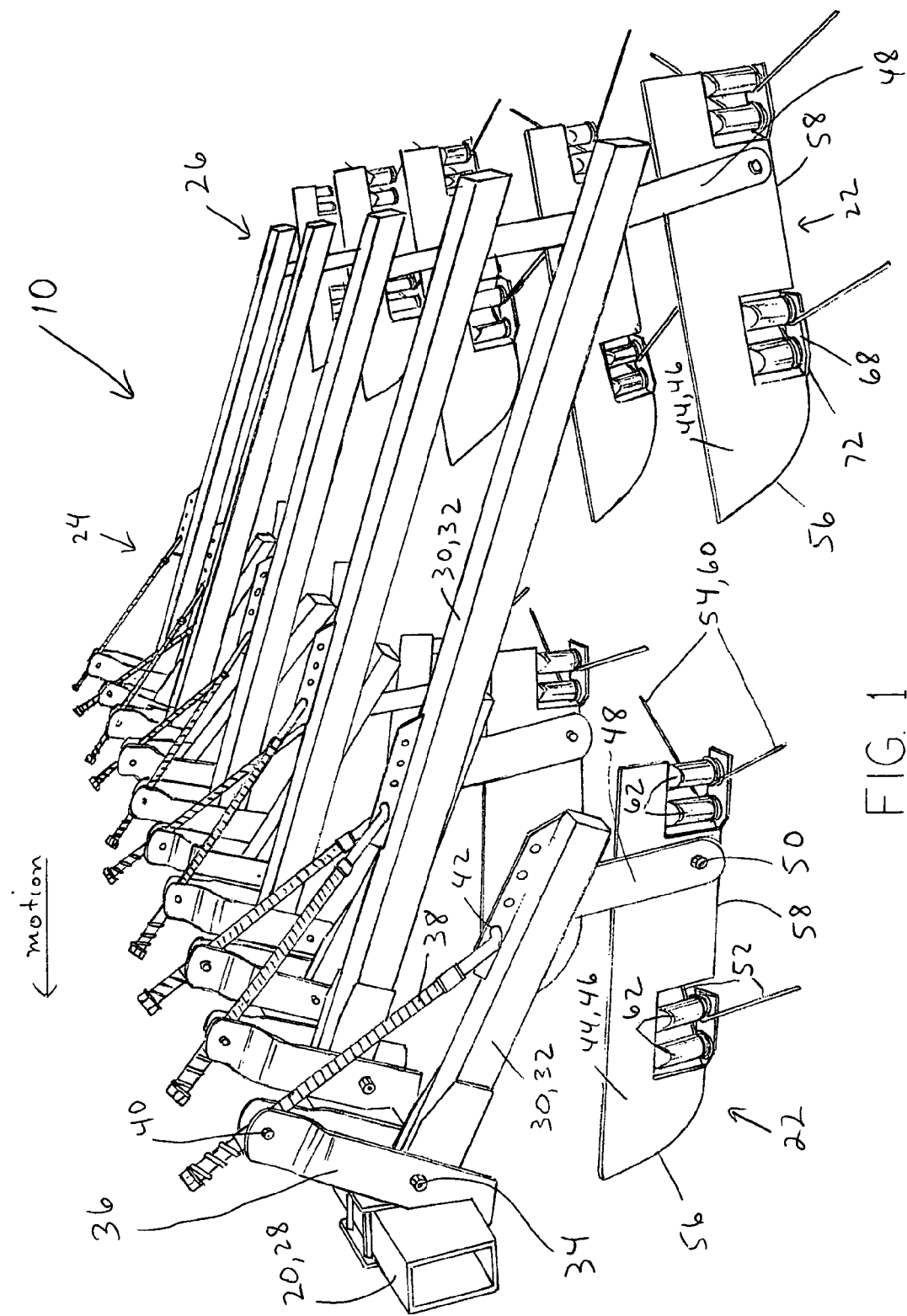
FIG. 1 is a perspective view of one embodiment of the inventive cranberry-harvesting apparatus.

FIGS. 1, 2 3, and 5 show a cranberry-harvesting apparatus 10 which is one embodiment of this invention. Apparatus 10 is configured to be pulled over a cranberry field. Apparatus 10 has a frame 20 which is pulled over a cranberry field in the direction indicated in FIG. 1. Apparatus 10 includes ten follower assemblies 22 configured in a forward gang 24 of follower assemblies 22 and a rearward gang 26 of follower assemblies 22. Cranberry-harvesting apparatus 11 of FIG. 6 is configured to be pushed over a cranberry field. This invention is described primarily with reference to apparatus 10; as will be apparent, the two embodiments are substantially similar to each other in their essential elements.

Frame 20 consists primarily of a principal cross-member 28. Each follower assembly 22 is attached to frame 20 by a support 30 (ten supports 30 for ten follower assemblies 22). In FIG. 1, five supports 30 are short and five are long, supporting gangs 24 and 26 respectively. Each support 30 includes an anchor arm 36 rigidly connected to principal cross-member 28, a longitudinal arm 32 which is pivotally mounted to anchor arm 36 by a pivot mount 34 located within anchor arm 36 near cross-member 28, a follower mount 48 affixed to longitudinal arm 32, a follower pivot 50 within follower mount 48 spaced away from longitudinal arm 32, and a spring linkage 38.

Follower assembly 22 is pivotally connected to follower mount 48 at a point within follower assembly 22 such that the center-of-gravity of follower assembly 22 is forward of follower pivot 50. Anchor arm 36 includes a first connection 40 spaced away from principal cross-member 28. Longitudinal arm 32 includes a second connection 42 also spaced away from cross-member 28. Spring linkage 38 is pivotally connected to first connection 40 and second connection 42 such that longitudinal arm 32 is able to pivot around pivot mount 34 as the contour of the field surface changes. Spring linkage 38 exerts a force such that follower assembly 22 is pushed downwardly onto the field surface.

Figure 2:
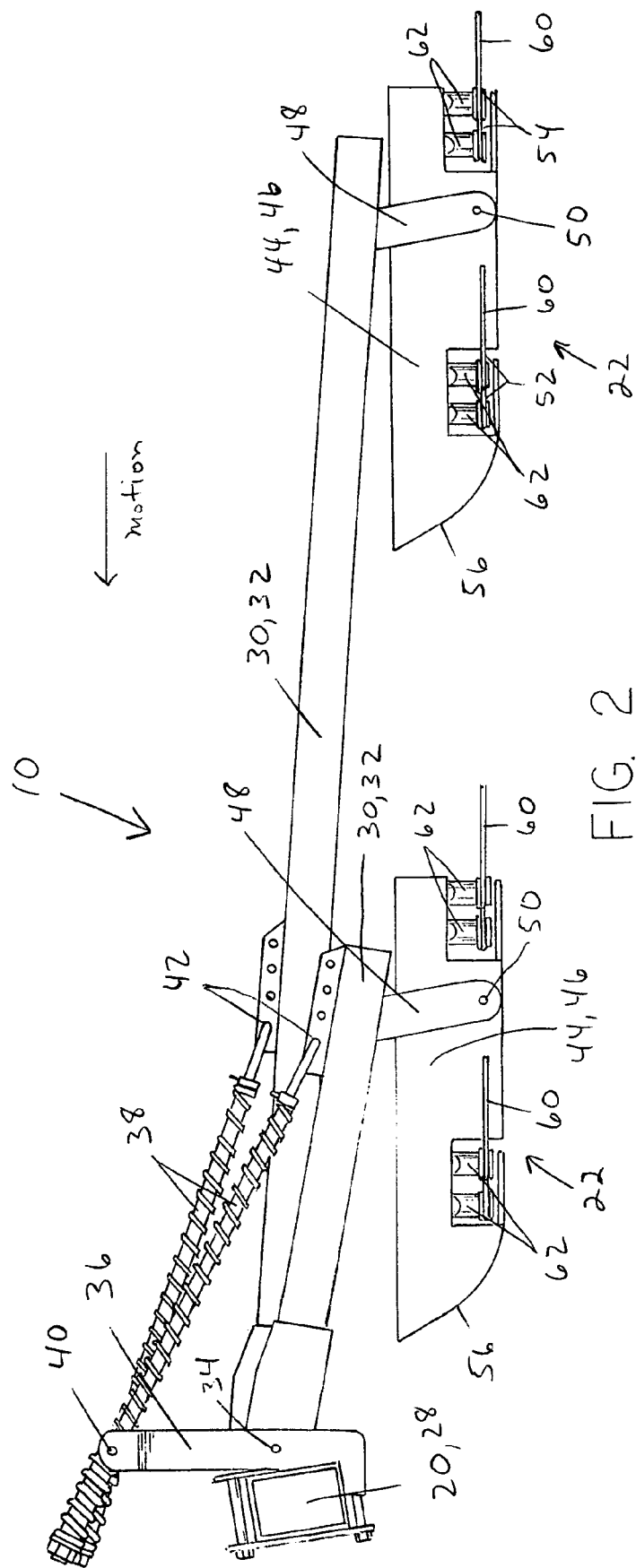
FIG. 2 is a side elevation of the embodiment shown in FIG. 1.

Referring to FIGS. 1 and 2, each follower assembly 22 includes a rod mount 44 which is comprised of a vertical plate 46, four spring posts 62 affixed to plate 46 (plate 46 and posts 62 are a preferably a weldment), a first pair 52 of dislodging rods 60 positioned forward of follower pivot 50 and a second pair 54 of dislodging rods 60 positioned rearward of follower pivot 50. Vertical plate 46 includes a convex surface-following leading end 56 and a lower portion 58. Follower pivot 50 is positioned at lower portion 58, and as noted above, behind the center-of-gravity of follower assembly 22 such that follower assembly 22 moves over the field surface substantially parallel to the field surface.

Figure 4A:
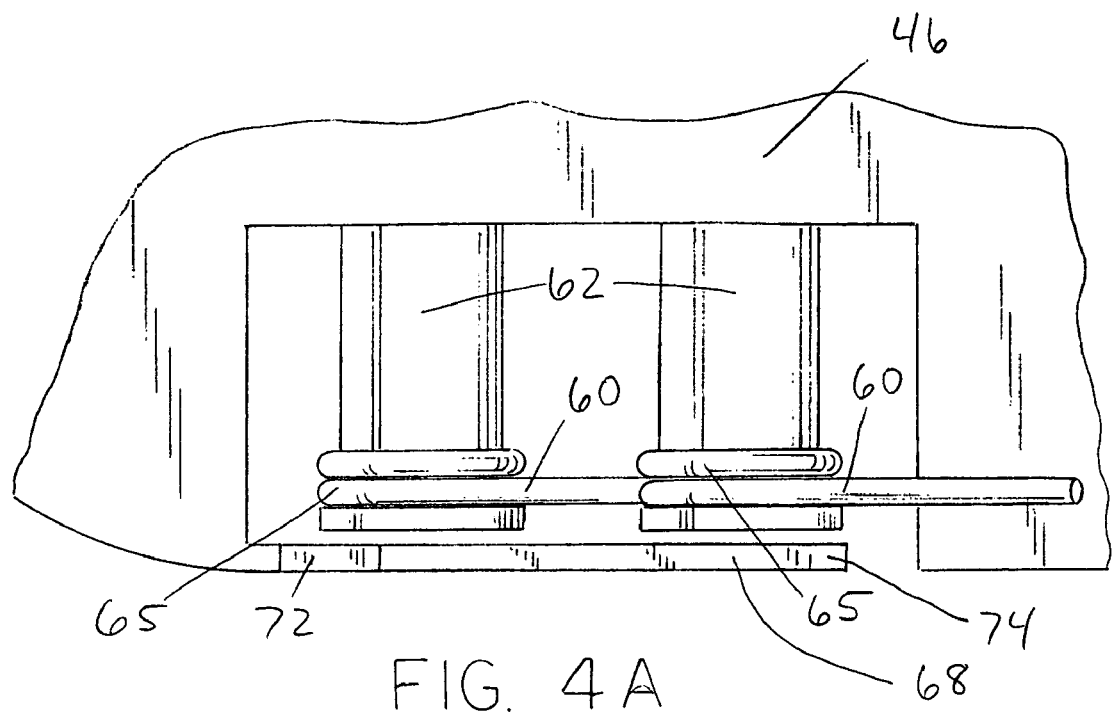
FIG. 4A is a detailed side elevation of a portion of one embodiment of a rod mount.
Figure 4B:
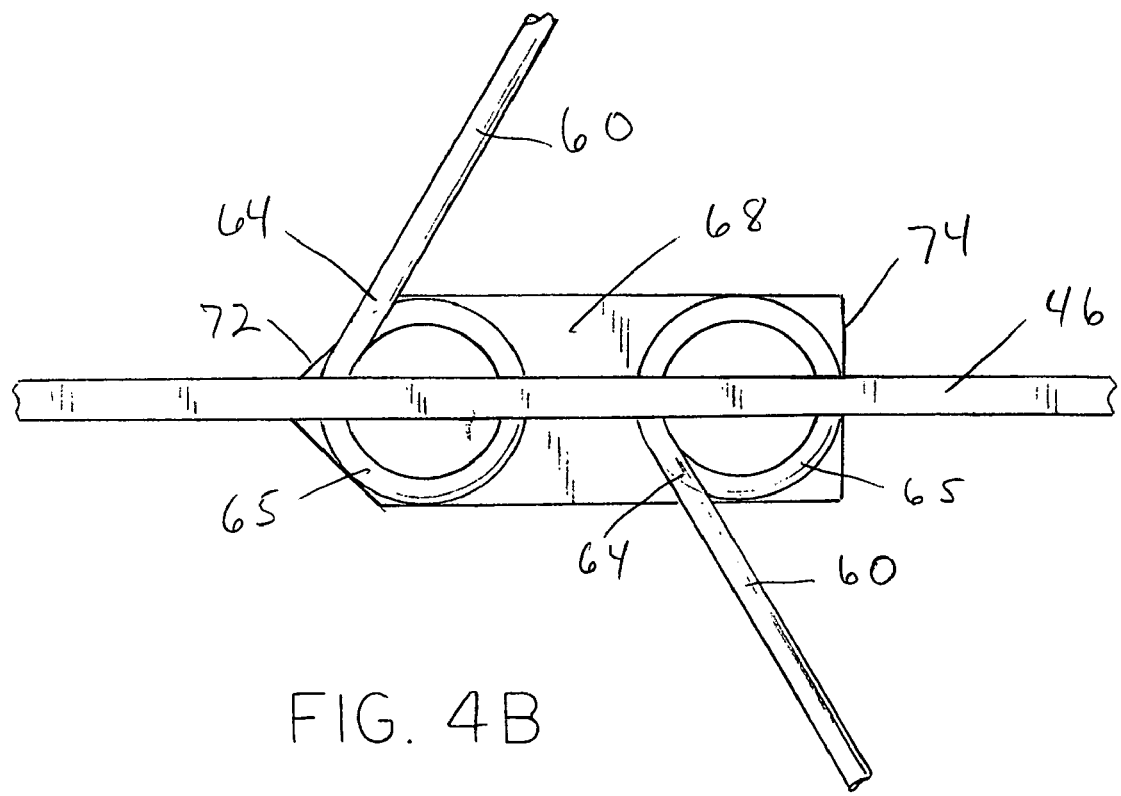
FIG. 4B is a top plan view of the rod mount shown in FIG. 4A.

Referring to FIGS. 4A and 4B, each dislodging rod 60 is mounted to vertical plate 46 by one of the spring posts 62 at a proximal end 64 of dislodging rod 60. Dislodging rods 60 typically have a circular cross-section as shown in FIGS. 4A and 4B. Proximal end 64 is formed into a coil spring 65 wrapped around spring post 62, thereby enabling dislodging rods 60 to deflect in a plane substantially parallel to the field surface under the load exerted by the cranberry plants on dislodging rod 60 as follower assembly 22 is moved over the field surface.

Figure 3:
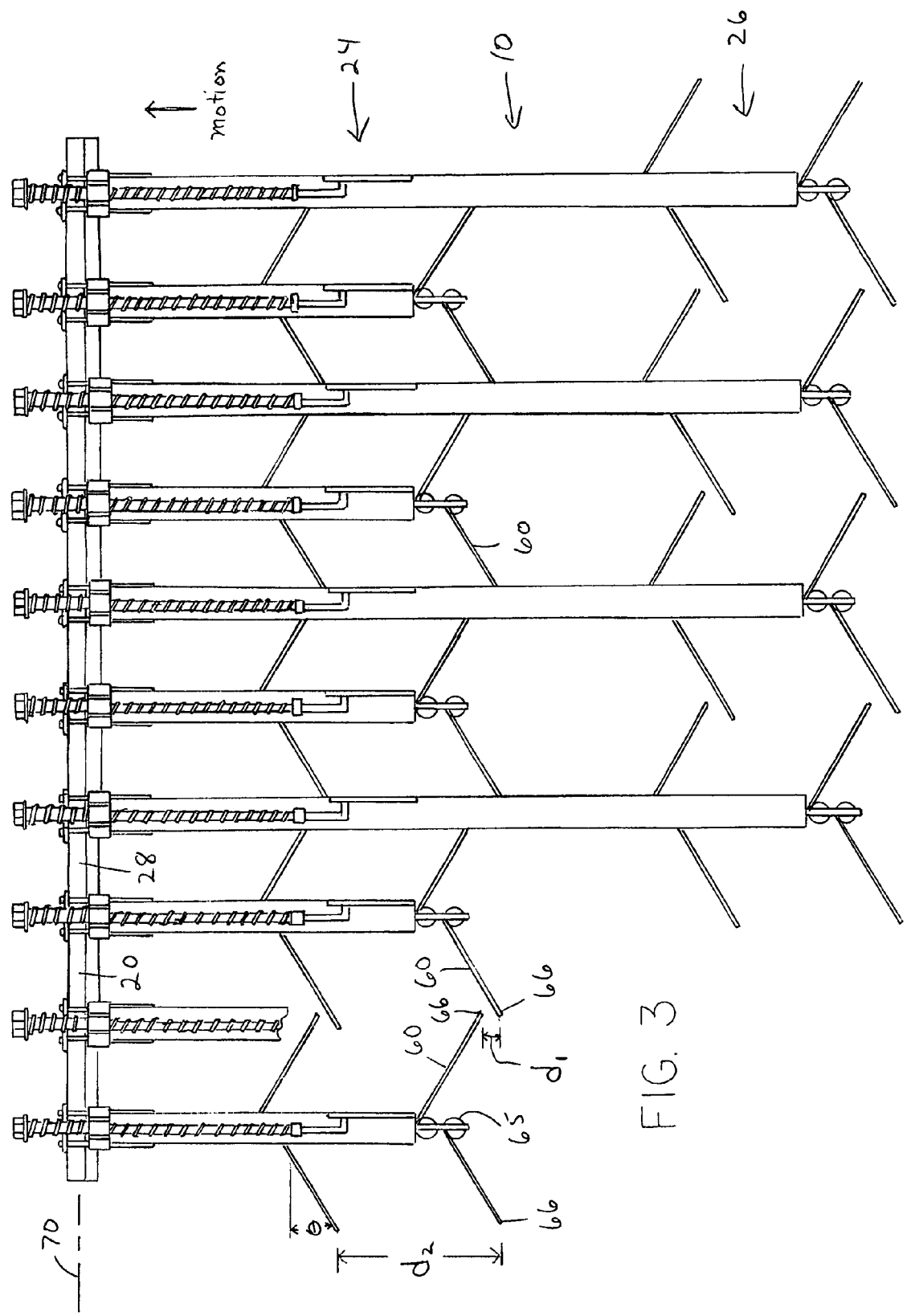
FIG. 3 is top plan view of the embodiment of FIG. 1 with the first-from-the-left of the longer longitudinal arms partially removed to show the overlapping distal ends of neighboring dislodging rods.

FIG. 3 is a top plan view of apparatus 10, illustrating the configuration of follower assemblies 22 into forward gang 24 and rearward gang 26. The leftmost follower assembly of rearward gang 26 is partially removed from FIG. 3 to illustrate the relative positions of dislodging rods 60 of neighboring follower assemblies within forward gang 24. Frame 20 has a major axis 70 which is generally perpendicular to the direction of motion of apparatus 10. Each dislodging rod 60 is mounted in an orientation canted at an angle θ with respect to major axis 70 as indicated on the leftmost and forwardmost dislodging rod 60 in FIG. 3. Angle θ is preferably set within the range of 15 to 40 degrees, most preferably about 25 degrees.

Each dislodging rod 60 has a distal end 66, and follower assemblies 22 are positioned within gangs 24 and 26 such that distal ends 66 of neighboring follower assemblies 22 overlap an amount sufficient to ensure that all of the cranberry plants are influenced by dislodging rods 60 as apparatus 10 is moved over the field surface even when dislodging rods 60 are deflected backwards under the load of the cranberry plants. Neighboring dislodging rods 60 of adjacent follower assemblies 22 within gangs 24 and 26 are positioned along the direction of motion with a distance $d_1$ between distal ends 66 such that cranberry plants which may become caught up on dislodging rods 60 are shed off distal ends 66 as apparatus 10 moves forward over the field surface. Distance $d_1$ is preferably at least four inches.

Each follower assembly 22 has first pair 52 and second pair 54 of dislodging rods 60, first pair 52 being positioned forward of second pair 54 by a distance $d_2$. Distance $d_2$ is preferably at least 12 inches and more typically between 16 and 18 inches. Distance $d_2$ is chosen to be sufficient to allow the cranberry plants which are compressed by first pair 52 to rise up before being compressed again by second pair 54. Distance $d_2$ is therefore dependent on the speed of the forward motion of apparatus 10. High speeds require $d_2$ to be larger. (Distance d, may be about half of distance $d_2$ or may be significantly less as shown in FIG. 3.)

The distance between forward gang 24 and rearward gang 26 of follower assemblies 22 is typically larger than distance $d_2$ to ensure that forward gang 24 and rearward gang 26 act on the cranberry plants in an independent fashion.

Referring again to FIGS. 4A and 4B, each rod mount 44 further includes two feet 68 which extend rearwardly from lower portion 58 of vertical plate 46 below first pair 52 and second pair 54. The function of feet 68 is to prevent the entanglement of cranberry plants in spring posts 62 and coil springs 65 as apparatus 10 moves over the field surface. Each foot 68 has a tapered front portion 72 to ease movement through the cranberry plants and an open rear portion 74 to release entangled plants.

Figure 5:
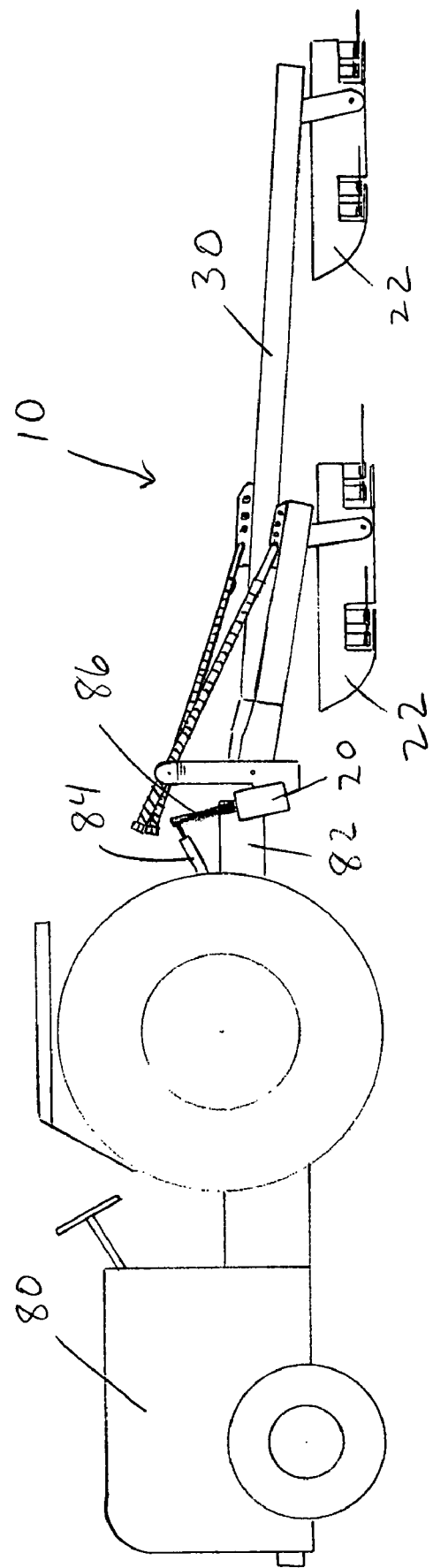
FIG. 5 is a side elevation of the inventive apparatus, including drive apparatus to pull the frame over the field of cranberries.
Figure 6:
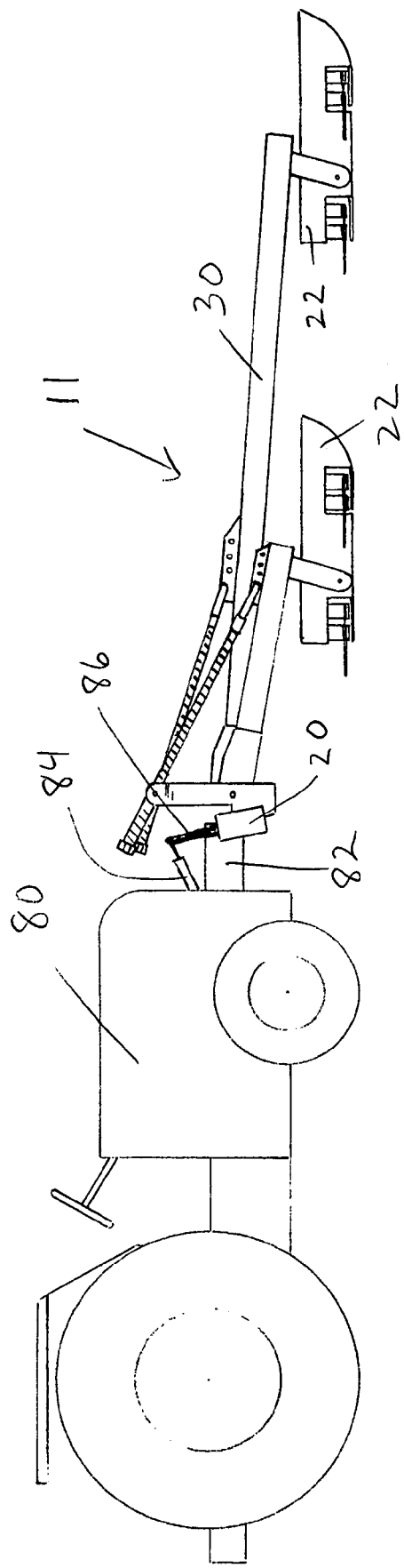
FIG. 6 is a side elevation of the inventive apparatus, including drive apparatus to push the frame over the field of cranberries.

FIGS. 5 and 6 are side elevations simply illustrating the fact that the inventive cranberry-harvesting apparatus can be both pulled (FIG. 5) and pushed (FIG. 6) over the field surface by a drive apparatus 80, typically a farm tractor suitably configured to drive over a cranberry field. Illustrated in both FIGS. 5 and 6, the harvesting apparatus is attached to drive apparatus 80 on a movable hitch 82. Movable hitch 82 is the standard movable hitch typically available on farm tractors to raise and lower farm implements for proper operation. In addition, frame 20 is able to be rotated on hitch 82 by hydraulic actuator 84 acting on frame arm 86, further enabling the height and orientation of apparatus 10 and 11 to be adjusted for proper operation. For example, in apparatus 11 in FIG. 6, follower assemblies 22 are mounted in the opposite direction from that of apparatus 10 with respect to frame 20 and supports 30.

Figure 7:
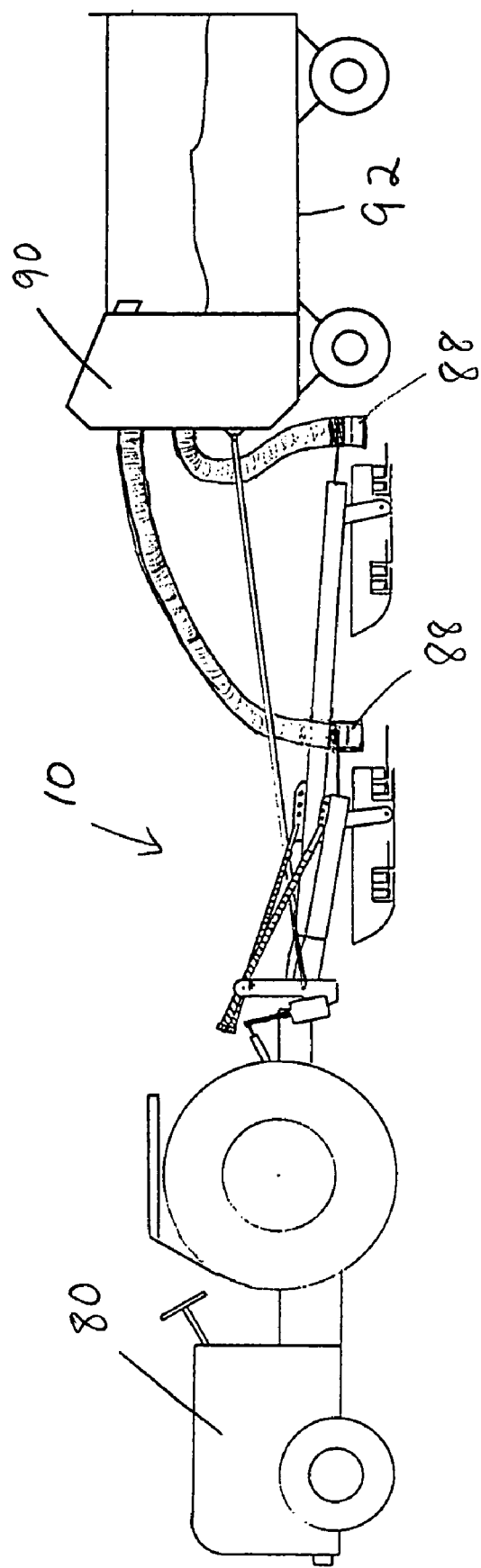
FIG. 7 is a side elevation of the inventive apparatus shown in FIG. 5 further including one vacuum nozzle behind each of the follower assemblies and a collection container.

FIG. 7 is a side elevation of the embodiment of FIG. 5 configured for dry harvesting of cranberries. Each follower assembly 22 has mounted immediately behind it a vacuum nozzle 88 connected to vacuum unit 90. Cranberries which are picked up by vacuum unit 90 through vacuum nozzles 88 are deposited into collection container 92.

The general operation of the apparatus 10 is as follows. Apparatus 10 is lowered down onto the field surface such that follower assemblies 22, primarily through dislodging rods 60, compress the cranberry plants from an uncompressed thickness, which is typically on the order of twelve inches, down to a thickness of a few inches. Apparatus 10 is moved forward over the field surface, thereby moving dislodging rods 60 over the field surface at the speed of apparatus 10. As dislodging rods 60 compress the cranberry plants, the cranberry fruit is dislodged from the cranberry plants with a minimum of damage to both fruit and vines. One mechanism by which this dislodging takes place is a squeegee-like action on the field surface. Except those areas covered by the left and right sides of apparatus 10, every point along the field surface is in general acted on by four dislodging rods 60, thereby providing significant opportunity for the cranberry fruit to be released from the cranberry plants.

Typically, apparatus 10 is moved forward over the field surface by drive apparatus 80 at speeds of five or six miles per hour, thereby being able to harvest approximately three acres of cranberries per hour. High-speed harvesting using the inventive apparatus may be carried out in flooded cranberry bogs, with subsequent cranberry recovery carried out using standard methods known in the art for the gathering of floating berries.

Apparatus 10 is able also to be used for dry harvesting of cranberries such that at least a substantial portion of the crop is harvested without being wetted. During dry harvesting, vacuum nozzles 88 mounted immediately behind follower assemblies 22, are used to pick up the cranberries which have been dislodged by dislodging rods 60. Since some of the dislodged cranberries may be trapped within the cranberry plants during dislodgement and vacuuming, the cranberry field may then be flooded and the typical methods for the gathering of dislodged cranberries in flooded fields used to complete the harvest.

While the principles of this invention have been described in connection with specific embodiments, it should be understood clearly that these descriptions are made only by way of example and are not intended to limit the scope of the invention.

The invention claimed is:

1. A cranberry-harvesting apparatus comprising:
   a frame movable over a field of cranberries in a forward direction;
   a plurality of follower assemblies each secured to and below the frame by a support, each follower assembly including:
      a rod mount having a lower portion, a surface-following leading end, and a pivot attachment to the support at the lower portion behind the center-of-gravity of the follower assembly; and
      first and second pairs of dislodging rods mounted to the rod mount forward and rearward of the pivot attachment respectively, each pair extending laterally from opposite sides of the lower portion substantially parallel to the field surface and canted rearwardly,
   whereby each rod mount is supported such that it moves through the cranberry plants at the speed of the frame to dislodge the cranberries from the plants.

2. The cranberry-harvesting apparatus of claim 1 wherein the first and second pairs of dislodging rods are spring-mounted such that the dislodging rods deflect under load in a plane substantially parallel to the field surface.

3. The cranberry-harvesting apparatus of claim 2 wherein:
   the rod mount is a vertical plate having spring posts extending downward to the lower portion; and
   each dislodging rod has a coiled proximal end forming a spring coiled around one of the spring posts.

4. The cranberry-harvesting apparatus of claim 3 further including feet extending from the lower portion rearwardly below each pair of spring posts whereby the feet reduce entanglement of plants with the spring posts.

5. The cranberry-harvesting apparatus of claim 1 wherein the dislodging rods have a substantially circular cross-section.

6. The cranberry-harvesting apparatus of claim 1 wherein:
   the frame has a major axis generally perpendicular to the movement thereof and parallel to the field surface;
   each dislodging rod has a free distal end;
   the follower assemblies are laterally spaced substantially equally along the major axis in alternating forward and rearward positions thereby forming offset forward and rearward gangs of adjacent assemblies such that the distal ends of the dislodging rods of adjacent assemblies overlap along the major axis; and
   the distal ends of the dislodging rods of adjacent assemblies of each gang are spaced apart along the direction of movement.

7. The cranberry-harvesting apparatus of claim 6 wherein the space along the direction of movement between the dislodging rod distal ends of adjacent follower assemblies is at least four inches.

8. The cranberry-harvesting apparatus of claim 6 wherein:
   the frame includes a principal cross-member; and
   each support includes a longitudinal arm pivotably mounted to the cross-member.

9. The cranberry-harvesting apparatus of claim 8 wherein each longitudinal arm is downwardly spring-biased against the field surface.

10. The cranberry-harvesting apparatus of claim 9 wherein each support further includes:
    an anchor arm affixed to the cross-member and having a first connection spaced therefrom;
    a second connection on the longitudinal arm spaced from the cross-member; and
    a spring linkage between the first and second connections such that the longitudinal arm moves under load with respect to the anchor arm to provide the downward biasing.

11. The cranberry-harvesting apparatus of claim 1 wherein each surface-following leading end is substantially convex.

12. The cranberry-harvesting apparatus of claim 1 wherein the frame is operator-movable up and down such that the surface-following leading ends can be positioned in and out of contact with the field surface.

13. The cranberry-harvesting apparatus of claim 1 wherein the space between the first and second pairs of dislodging rods is at least twelve inches.

14. The cranberry-harvesting apparatus of claim 1 wherein the cant angle of the dislodging rods is between 15 and 40 degrees from the major axis.

15. The cranberry-harvesting apparatus of claim 1 further including a drive apparatus to move the frame over a field of cranberries.

16. The cranberry-harvesting apparatus of claim 15 wherein the frame is mounted to the front of the drive apparatus.

17. The cranberry-harvesting apparatus of claim 15 wherein the frame is mounted to the back of the drive apparatus.

18. The cranberry-harvesting apparatus of claim 1 further including at least one vacuum nozzle behind the follower assemblies whereby the dislodged cranberries are picked up by vacuum suction.

19. The cranberry-harvesting apparatus of claim 18 wherein the at least one vacuum nozzle includes one vacuum nozzle behind each of the follower assemblies.

20. The cranberry-harvesting apparatus of claim 18 further including a collection container.

21. An apparatus for harvesting cranberries from a cranberry field, comprising:
   a frame movable over the field of cranberries in a forward direction; and
   at least one vertical plate secured to the frame and oriented substantially parallel to the direction of movement; and
   a plurality of dislodging rods each of which is spring-mounted at its proximal end to one of the vertical plate(s) and extends laterally and transverse with respect to the direction of movement, the rods together being substantially in a single plane parallel to the field surface,
whereby each dislodging rod is moved through the cranberry plants at the speed of the frame to dislodge the cranberries from the plants.

22. The cranberry-harvesting apparatus of claim 21 wherein the dislodging rods are angled slightly rearwardly.

23. The cranberry-harvesting apparatus of claim 21 wherein each dislodging rod has a free distal end such that the rod deflects under load in a plane substantially parallel to the field surface.

24. The cranberry-harvesting apparatus of claim 21 including a plurality of follower assemblies, each follower assembly including one of the vertical plates and forward and rearward pairs of dislodging rods, each pair of rods including a rod extending from each side of the plate.

25. The cranberry-harvesting apparatus of claim 24 wherein the follower assemblies are mounted to the frame in alternating forward and rearward positions.

26. The apparatus of claim 21 wherein substantially the entirety of each rod is substantially in the single plane parallel to the field surface.

27. A method of harvesting cranberries from a cranberry field including moving frame-mounted, free-ended dislodging rods through cranberry plants with each rod moving at the speed of the frame, each rod being spring-mounted with respect to the frame and extending laterally and transverse with respect to the direction of movement of the frame, the rods together being substantially in a single plane parallel to the field surface, thereby to dislodge cranberries from the cranberry plants.

28. The method of claim 27 further including the steps of vacuuming up dislodged cranberries immediately after dislodgement and collecting the cranberries in a container.

29. The method of claim 27 wherein substantially the entirety of each rod is substantially in the single plane parallel to the field surface.

30. A cranberry-harvesting apparatus comprising:
   a frame movable over a field of cranberries in a forward direction; and
   a plurality of support-rod assemblies each secured to the frame and each including:
      a rod mount; and
      a pair of dislodging rods mounted to the rod mount, each rod including a portion which extends laterally and transverse with respect to the direction of movement, the rods together being substantially in a single plane parallel to the field surface,
whereby each rod is supported such that it moves through the cranberry plants at the speed of the frame to dislodge the cranberries from the plants.

31. The cranberry-harvesting apparatus of claim 30 wherein the dislodging rods are spring-mounted to the rod mount such that the dislodging rods deflect under load in a plane substantially parallel to the field surface.

32. The cranberry-harvesting apparatus of claim 30 wherein the dislodging rods have a substantially circular cross-section.

33. The cranberry-harvesting apparatus of claim 30 further including a drive apparatus to move the frame over the field of cranberries.

34. The cranberry-harvesting apparatus of claim 33 wherein the frame is mounted to the front of the drive apparatus.

35. The cranberry-harvesting apparatus of claim 33 wherein the frame is mounted to the back of the drive apparatus.

36. The cranberry-harvesting apparatus of claim 30 wherein substantially the entirety of each rod is substantially in the single plane parallel to the field surface.

* * * * *

UNITED STATES PATENT AND TRADEMARK OFFICE
CERTIFICATE OF CORRECTION

| | | |
|---|---|---|
| PATENT NO. | : 7,121,075 B2 | Page 1 of 1 |
| APPLICATION NO. | : 10/760445 | |
| DATED | : October 17, 2006 | |
| INVENTOR(S) | : Brockman | |

It is certified that error appears in the above-identified patent and that said Letters Patent is hereby corrected as shown below:

On Title Page, Item (76)
delete "Danial" and insert -- Daniel --.

Signed and Sealed this

Tenth Day of April, 2007

JON W. DUDAS
*Director of the United States Patent and Trademark Office*